(12) United States Patent
Runner

(10) Patent No.: US 6,204,568 B1
(45) Date of Patent: Mar. 20, 2001

(54) TRAFFIC-BASED ENERGY CONVERSION SYSTEM

(76) Inventor: John Runner, 1405 24th St. SW., Birmingham, AL (US) 35211

( * ) Notice: Subject to any disclaimer, the term of this patent is extended or adjusted under 35 U.S.C. 154(b) by 0 days.

(21) Appl. No.: 09/397,251

(22) Filed: Sep. 16, 1999

(51) Int. Cl.[7] ..................................................... F03G 7/00
(52) U.S. Cl. ............................................................ 290/1 R
(58) Field of Search ........................... 290/1 R; 60/668, 60/533; 417/229

(56) References Cited

U.S. PATENT DOCUMENTS

| | | |
|---|---|---|
| D. 332,936 | 2/1993 | Lawrence . |
| 4,004,422 | 1/1977 | Le Van . |
| 4,081,224 | 3/1978 | Krupp . |
| 4,173,431 | 11/1979 | Smith . |
| 4,238,687 * | 12/1980 | Martinez ................................ 290/1 R |
| 4,239,975 * | 12/1980 | Chiappetti ............................ 290/1 R |
| 4,322,673 | 3/1982 | Dukess . |
| 4,339,920 * | 7/1982 | Le Van ................................... 60/533 |
| 4,409,489 | 10/1983 | Hayes . |
| 4,418,542 * | 12/1983 | Ferrell .................................... 60/668 |
| 4,614,875 * | 9/1986 | McGee ................................. 290/1 R |
| 4,739,179 * | 4/1988 | Sites .................................... 290/1 R |
| 4,980,572 * | 12/1990 | Sen ...................................... 290/1 R |
| 5,634,774 * | 6/1997 | Angel et al. .......................... 417/229 |
| 6,091,159 * | 6/2000 | Galich ................................. 290/1 R |

* cited by examiner

*Primary Examiner*—Nicholas Ponomarenko

(57) ABSTRACT

A system is provided for converting mechanical motion of vehicles into electrical energy. The system includes a plurality of motion converter assemblies each including a rod which remains in communication with a vertical motion delivery mechanism via a gearing mechanism for rotating the rod in response to traffic flowing thereover. Also included is a plurality of pumps each connected to the rotating rod for generating pressurized fluid in response thereto. A fluid turbine is provided for generating electrical energy upon the receipt of the pressurized fluid.

7 Claims, 2 Drawing Sheets

TRAFFIC-BASED ENERGY CONVERSION SYSTEM

BACKGROUND OF THE INVENTION

1. Field of the Invention

The present invention relates to energy conversion systems and more particularly pertains to a new traffic-based energy conversion system for converting mechanical motion of vehicles into electrical energy.

2. Description of the Prior Art

The use of energy conversion systems is known in the prior art. More specifically, energy conversion systems heretofore devised and utilized are known to consist basically of familiar, expected and obvious structural configurations, notwithstanding the myriad of designs encompassed by the crowded prior art which have been developed for the fulfillment of countless objectives and requirements.

Known prior art energy conversion systems include U.S. Pat. No. 4,173,431; U.S. Pat. No. 4,081,224; U.S. Pat. No. 4,004,422; U.S. Pat. No. 4,322,673; U.S. Pat. No. 4,409,489; and U.S. Patent Des. 332,936.

In these respects, the traffic-based energy conversion system according to the present invention substantially departs from the conventional concepts and designs of the prior art, and in so doing provides an apparatus primarily developed for the purpose of converting mechanical motion of vehicles into electrical energy.

SUMMARY OF THE INVENTION

In view of the foregoing disadvantages inherent in the known types of energy conversion systems now present in the prior art, the present invention provides a new traffic-based energy conversion system construction wherein the same can be utilized for converting mechanical motion of vehicles into electrical energy.

The general purpose of the present invention, which will be described subsequently in greater detail, is to provide a new traffic-based energy conversion system apparatus and method which has many of the advantages of the energy conversion systems mentioned heretofore and many novel features that result in a new traffic-based energy conversion system which is not anticipated, rendered obvious, suggested, or even implied by any of the prior art energy conversion systems, either alone or in any combination thereof.

To attain this, the present invention generally comprises a one-way road having a plurality of laterally spaced gaps formed therein, as shown in FIG. 1. Also included is a plurality of motion converter assemblies. As shown in FIGS. 3 & 4, each motion converter assembly has a thin rectangular base defined by a top face, a bottom face, and a peripheral side wall mounted between the top face and the bottom face. As such, an interior space is defined with a plurality of supports formed therein for maintaining the shape of the base. The base of each motion converter assembly is situated within one of the gaps of the road, as shown in FIG. 1. Further, each base has a rod rotatably mounted within the base, wherein the rod extends along a length of the base. Each motion converter assembly further includes a pair of planar rectangular lever plates each having an elongated inboard end pivotally coupled to the top face of the base adjacent to one of the elongated edges thereof. For urging the lever plates upwardly, a plurality of coil springs are each mounted within a recess formed in the top face of the base and remain in engagement with an underside of the associated lever. As shown in FIGS. 3 & 4, at least one gear strip has a top end pivotally coupled to the underside of the lever plate adjacent to a free edge thereof. Such gear strip is equipped with a plurality of gear teeth. A second end of each gear strip is slidably situated within a slot formed in the base adjacent to the rod. As such, the gear teeth of the gear strip are maintained in engagement with a disk-shaped ratchet gear mounted on the rod. By this structure, the rod is adapted to rotate in a single direction upon the flow of traffic over the lever plates of the motion converter assemblies. With reference now to FIG. 1, a plurality of pumps are each mounted to the base of an associated one of the motion converter assemblies. Such pumps are each further in communication with the rotating rod of the corresponding base for generating pressurized air in response thereto. Also shown in FIG. 1, a plurality of air reservoirs are each connected to one of the pumps for receiving and storing the pressurized air therefrom. It should be noted that each of the air reservoirs are interconnected with respect to each other. Finally, an air turbine is connected to the air reservoirs for generating electrical energy upon the receipt of air from the air reservoirs.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new traffic-based energy conversion system apparatus and method which has many of the advantages of the energy conversion systems mentioned heretofore and many novel features that result in a new traffic-based energy conversion system which is not anticipated, rendered obvious, suggested, or even implied by any of the prior art energy conversion systems, either alone or in any combination thereof.

It is another object of the present invention to provide a new traffic-based energy conversion system which may be easily and efficiently manufactured and marketed.

It is a further object of the present invention to provide a new traffic-based energy conversion system which is of a durable and reliable construction.

An even further object of the present invention is to provide a new traffic-based energy conversion system which is susceptible of a low cost of manufacture with regard to both materials and labor, and which accordingly is then susceptible of low prices of sale to the consuming public, thereby making such traffic-based energy conversion system economically available to the buying public.

Still yet another object of the present invention is to provide a new traffic-based energy conversion system which provides in the apparatuses and methods of the prior art some of the advantages thereof, while simultaneously overcoming some of the disadvantages normally associated therewith.

Still another object of the present invention is to provide a new traffic-based energy conversion system for converting mechanical motion of vehicles into electrical energy.

Even still another object of the present invention is to provide a new traffic-based energy conversion system that includes a plurality of motion converter assemblies each including a rod which remains in communication with a vertical motion delivery mechanism via a gearing mechanism for rotating the rod in response to traffic flowing thereover. Also included is a plurality of pumps each connected to the rotating rod for generating pressurized fluid in response thereto. A fluid turbine is provided for generating electrical energy upon the receipt of the pressurized fluid.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
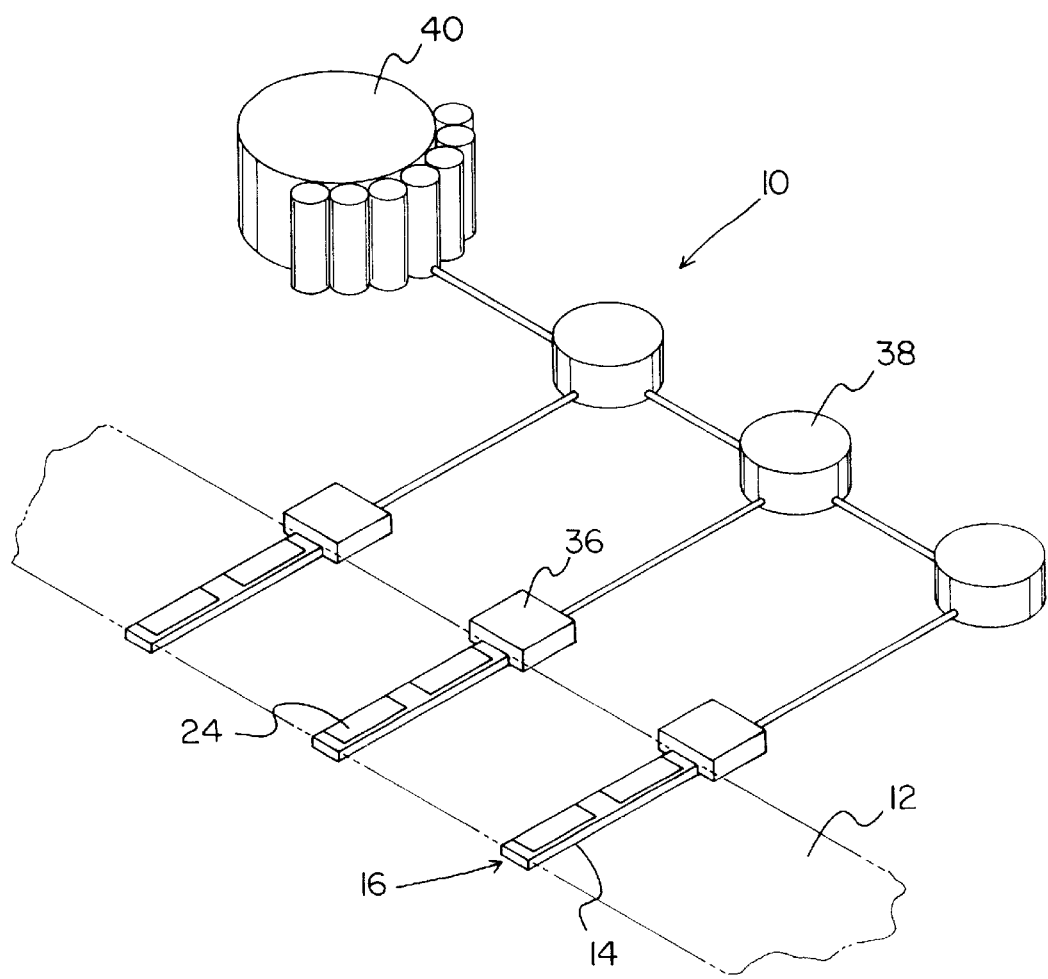
FIG. 1 is a perspective view of a new traffic-based energy conversion system according to the present invention.
Figure 2:
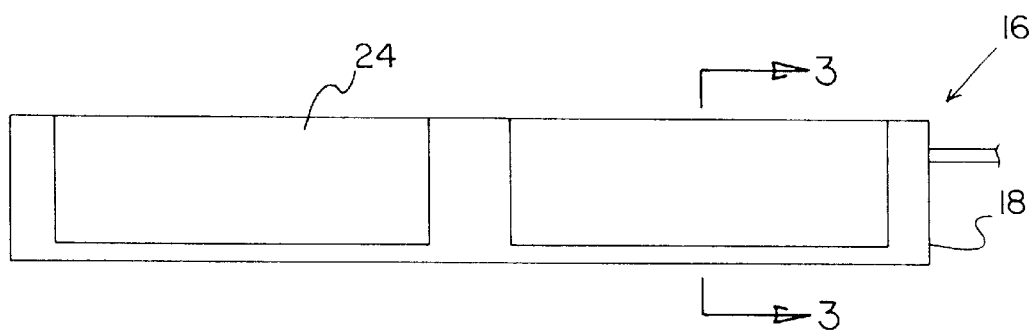
FIG. 2 is a top view of the present invention.

With reference now to the drawings, and in particular to FIGS. 1 through 4 thereof, a new traffic-based energy conversion system embodying the principles and concepts of the present invention and generally designated by the reference numeral 10 will be described.

Figure 3:
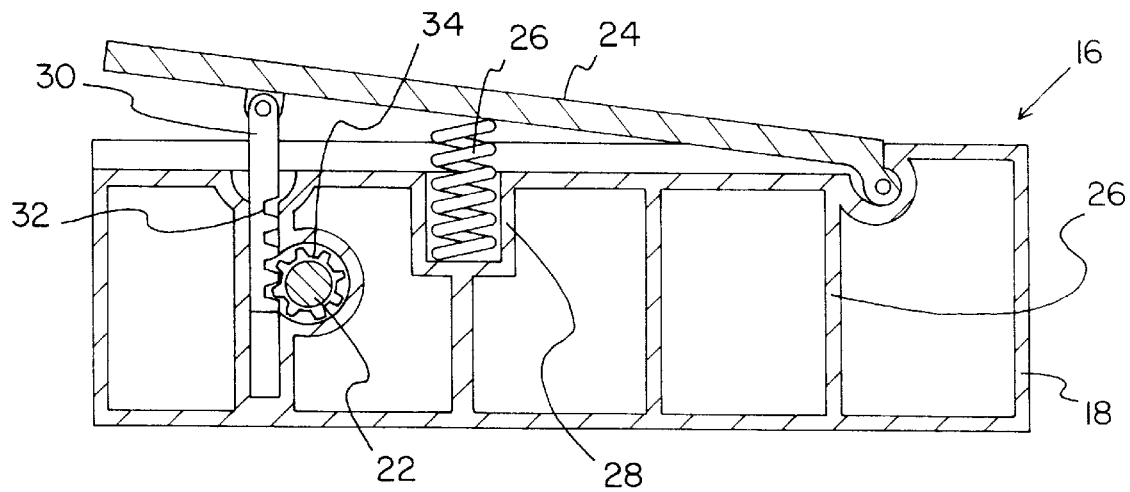
FIG. 3 is a side cross-sectional view of the present invention taken along line 3—3 shown in FIG. 2.
Figure 4:
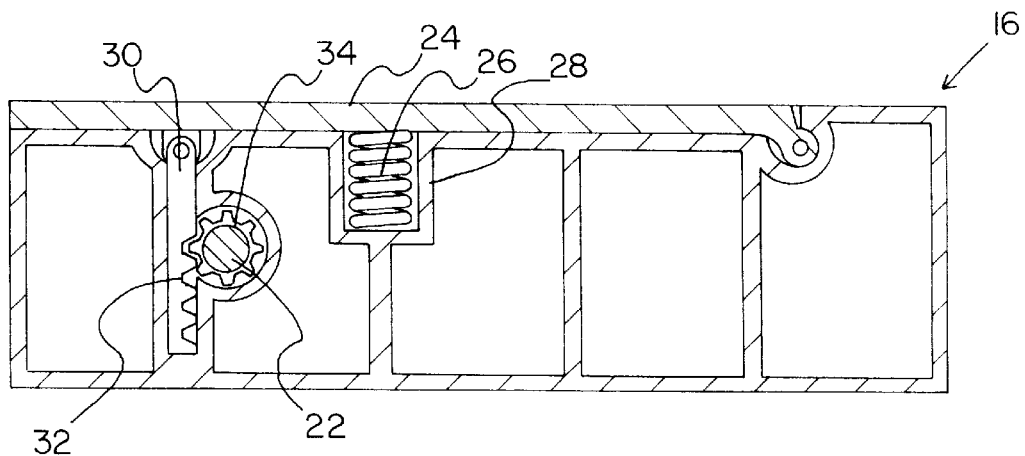
FIG. 4 is another side cross-sectional view of the present invention with the lever plate depressed.

The present invention, designated as numeral 10, includes a one-way road 12 having a plurality of laterally spaced gaps 14 formed therein, as shown in FIG. 1. Also included is a plurality of motion converter assemblies 16. As shown in FIGS. 3 & 4, each motion converter assembly has a thin rectangular base 18 defined by a top face, a bottom face, and a peripheral side wall mounted between the top face and the bottom face. As such, an interior space is defined with a plurality of supports 20 formed therein for maintaining the shape of the base.

The base of each motion converter assembly is situated within one of the gaps of the road, as shown in FIG. 1. Further, each base has a horizontally oriented single rod 22 rotatably mounted therein, wherein the rod extends along an entire length of the base. Each motion converter assembly further includes a pair of planar rectangular lever plates 24 each having an elongated inboard end pivotally coupled to the top face of the base adjacent to one of the elongated edges thereof. In the preferred embodiment, there are two lever plates mounted on each base or in the alternative, at least one lever plate for each lane of traffic.

For urging the lever plates upwardly, a plurality of coil springs 26 are each mounted within a recess 28 formed in the top face of the base. The springs each remain in engagement with an underside of the associated lever. As shown in FIGS. 3 & 4, at least one gear strip 30 has a top end pivotally coupled to the underside of the lever plate adjacent to a free edge thereof. Such gear strip is equipped with a plurality of gear teeth 32. A second end of each gear strip is slidably situated within a slot formed in the base adjacent to the rod. As such, the gear teeth of the gear strip are maintained in engagement with a disk-shaped ratchet gear 34 mounted on the rod. Such ratchet gear preferably rotates the rod coincidentally therewith when rotated in a first direction and further rotates independently when rotated in a second direction. The ratchet gear thus functions in a manner similar to rear sprocket gears of bicycles. By this structure, the rod is adapted to rotate in a single direction upon the flow of traffic over the lever plates of the motion converter assemblies.

With reference now to FIG. 1, a plurality of pumps 36 are each mounted to the base of an associated one of the motion converter assemblies. Such pumps are each further in communication with the rotating rod of the corresponding base for generating pressurized air in response thereto. Also shown in FIG. 1, a plurality of air reservoirs 38 are each connected to one of the pumps for receiving and storing the pressurized air therefrom. It should be noted that the air reservoirs are interconnected with respect to each other. Finally, an air turbine 40 is connected to the air reservoirs for generating electrical energy upon the receipt of pressurized air from the air reservoirs. Preferably each of the reservoirs are equipped with one-way valves to only allow the flow of air from the pumps to the reservoirs and from the reservoirs to the air turbine.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A system for converting mechanical motion of vehicles into electrical energy comprising, in combination:

a one-way road having a plurality of laterally spaced gaps formed therein;

a plurality of motion converter assemblies each including a thin rectangular base defined by a top face, a bottom face, and a peripheral side wall mounted between the top face and the bottom face to define an interior space with a plurality of supports formed therein for maintaining the shape of the base, the base of each motion converter assembly being situated within one of the gaps of the road and further having a rod rotatably mounted within the base wherein the rod extends along a length of the base, each motion converter assembly further including a pair of planar rectangular lever plates each having an elongated inboard end pivotally coupled to the top face of the base adjacent to one of the elongated edges thereof, a plurality of coil springs each mounted within a recess formed in the top face of the base and further in engagement with an underside of the associated lever for urging the same upwardly, at least one gear strip with a plurality of gear teeth having a top end pivotally coupled to the underside of the lever plate adjacent to a free edge thereof and a second end slidably situated within a slot formed in the base adjacent to the rod such that the gear teeth of the gear strip are in engagement with a disk-shaped ratchet gear mounted on the rod, wherein the rod is adapted to rotate in a single direction upon the flow of traffic over the lever plates of the motion converter assemblies;

a plurality of pumps each mounted to the base of an associated one of the motion converter assemblies and further in communication with the rotating rod thereof for generating pressurized air in response thereto;

a plurality of air reservoirs each connected to one of the pumps for receiving and storing the pressurized air therefrom, wherein each of the air reservoirs are interconnected with respect to each other; and an air turbine connected to the air reservoirs for generating electrical energy upon the receipt thereof from the air reservoirs.

2. A system for converting mechanical motion of vehicles into electrical energy comprising:

a plurality of motion converter assemblies each including a rod which remains in communication with a vertical motion delivery mechanism via a gearing mechanism for rotating the rod in response to traffic flowing thereover;

a plurality of pumps each connected to the rotating rod for generating pressurized fluid in response thereto; and a fluid turbine for generating electrical energy upon the receipt of the pressurized fluid.

3. The system for converting mechanical motion of vehicles into electrical energy as set forth in claim 2 wherein the vertical motion delivery mechanism includes a lever.

4. The system for converting mechanical motion of vehicles into electrical energy as set forth in claim 3 wherein the lever has a planar rectangular configuration.

5. The system for converting mechanical motion of vehicles into electrical energy as set forth in claim 3 wherein the lever has a spring mounted thereunder for urging the same upwardly.

6. The system for converting mechanical motion of vehicles into electrical energy as set forth in claim 2 wherein the gearing mechanism includes a gear strip mounted on the vertical motion delivery mechanism, the gear strip being in engagement with a ratchet gear mounted on the rod.

7. The system for converting mechanical motion of vehicles into electrical energy as set forth in claim 2 wherein fluid reservoirs are each connected between one of the pumps and the turbine.

\* \* \* \* \*